US010878433B2

(12) United States Patent
Jaidka et al.

(10) Patent No.: US 10,878,433 B2
(45) Date of Patent: Dec. 29, 2020

(54) TECHNIQUES FOR GENERATING A PSYCHOGRAPHIC PROFILE

(71) Applicant: Adobe Inc., San Jose, CA (US)

(72) Inventors: Kokil Jaidka, Manimajra (IN); Vamsi Krishna Bokam, Adyar (IN); Soham Dan, Kolkata (IN); Atanu R. Sinha, Boulder, CO (US); Yogesh Singh, Assam (IN)

(73) Assignee: Adobe Inc., San Jose, CA (US)

( * ) Notice: Subject to any disclaimer, the term of this patent is extended or adjusted under 35 U.S.C. 154(b) by 674 days.

(21) Appl. No.: 15/070,823

(22) Filed: Mar. 15, 2016

(65) Prior Publication Data

US 2017/0270544 A1 Sep. 21, 2017

(51) Int. Cl.
*G06Q 30/02* (2012.01)
*G06Q 10/06* (2012.01)
*G06N 7/00* (2006.01)
*G06N 20/00* (2019.01)

(52) U.S. Cl.
CPC ......... *G06Q 30/0202* (2013.01); *G06N 7/005* (2013.01); *G06N 20/00* (2019.01)

(58) Field of Classification Search
CPC .............................. G06Q 30/02; G06Q 10/06
USPC ....................................................... 705/7.31
See application file for complete search history.

(56) References Cited

U.S. PATENT DOCUMENTS

| | | | |
|---|---|---|---|
| 7,181,438 B1 | 2/2007 | Szabo | |
| 9,176,966 B2 | 11/2015 | Silverstein et al. | |
| 9,317,566 B1 * | 4/2016 | L'Huillier | ........... G06F 17/3053 |
| 2007/0067297 A1 | 3/2007 | Kublickis | |
| 2008/0065471 A1 * | 3/2008 | Reynolds | ............... G06Q 10/06 705/7.32 |
| 2008/0199042 A1 | 8/2008 | Smith | |
| 2008/0249867 A1 * | 10/2008 | Angell | ................... G06Q 30/02 705/14.26 |

(Continued)

FOREIGN PATENT DOCUMENTS

WO 2005003899 A2 1/2005

OTHER PUBLICATIONS

Allport, Gordon W., et al., "Trait-Names: A Psycho-Lexical Study", Psychological Monographs, vol. 47, No. 1, 1936, 177 pages.

(Continued)

*Primary Examiner* — Nga B Nguyen
(74) *Attorney, Agent, or Firm* — Kilpatrick Townsend & Stockton LLP

(57) ABSTRACT

This disclosure relates to utilizing a statistical model trained on character dimensions to determine a likelihood of a person purchasing a product. The method may include obtaining user-input data of a first person (e.g., textual-input data, survey-response data, offer information, or clickstream data associated with a first person). A character profile for the first person is derived using the user-input data and a psycholinguistic lexicon. A statistical model is generated based on the derived character profile of the first person. Second user-input data associated with a second person is obtained. The second user-input is applied to the statistical model to determine an output of the model (e.g., a statistical probability value that quantifies, for example, a predicted intention of the second person to purchase a particular product).

20 Claims, 11 Drawing Sheets

(56) References Cited

U.S. PATENT DOCUMENTS

| | | | |
|---|---|---|---|
| 2009/0006206 A1 | 1/2009 | Groe | |
| 2009/0112701 A1 | 4/2009 | Turpin | |
| 2011/0099133 A1* | 4/2011 | Chang | G06N 20/00 |
| | | | 706/12 |
| 2011/0119125 A1 | 5/2011 | Janangula | |
| 2012/0316916 A1* | 12/2012 | Andrews | G06Q 40/08 |
| | | | 705/7.28 |
| 2013/0231974 A1* | 9/2013 | Harris | G06Q 30/0201 |
| | | | 705/7.29 |
| 2014/0244359 A1* | 8/2014 | Haber | G06Q 30/0204 |
| | | | 705/7.33 |
| 2016/0189173 A1* | 6/2016 | King | G06Q 30/0201 |
| | | | 705/7.29 |
| 2016/0203498 A1* | 7/2016 | Das | G06Q 30/02 |
| | | | 705/7.29 |
| 2017/0052971 A1* | 2/2017 | Boyer | G06F 16/345 |
| 2017/0140429 A1* | 5/2017 | Cheng | G06F 16/3329 |

OTHER PUBLICATIONS

Kanokwan, Atchariyachanvanich, et al., "What Keeps Online Customers Repurchasing Through the Internet", ACM SIGecom Exchanges, 6(2), Jan. 2007, 11 pages.

Babin, Barry, et al., "Work and/or Fun: Measuring Hedonic and Utilitarian Shopping Value", Journal of Consumer Research, vol. 20, Issue 4, Mar. 1994, 2 pages.

Digman, John, M., "Personality Structure: Emergence of the Five-Factor Model", Annual Review of Psychology, 41, 1990, 24 pages.

Disc Profile , "Disc style in Sales", https://www.discprofiles.com/blog/2014/05/disc-styles-sales/, May 2014, 4 pages.

eMarketer, "APAC Marketers Challenged to Find the Right Audience", https://www.emarketer.com/Article/APAC-Marketers-Challenged-Find-Right-Audience/1012493, May 18, 2015, accessed Aug. 19, 2019, 2 pages.

John, Oliver P., et al., "Paradigm shift to the integrative big five trait taxonomy", Handbook of personality: Theory and Research, $3^{rd}$ Edition, Jan. 2008.

Kau, Ah Kend, et al., "Typology of Online Shoppers" Journal of Consumer Marketing, 20(2), 2003, 18 pages.

Kim, Jae-Il, et al., "Factors Affecting Online Search Intention and Online Purchase Intention", Seoul Journal of Business, vol. 10, No. 2 Dec. 2004, 27 pages.

Mowen, John C., et al., "Toward a Theory of Motivation and Personality With Application to Word-Of-Mouth Communications", Journal of Business Research, 60(6), 2007, 7 pages.

Pennebaker, James W., et al., "Linguistic Styles: Language Use As an Individual Difference". Journal of Personality and Social Psychology, 77(6), Dec. 1999.

Rain Group, "The Eight Buyer Personas and How to Sell to Them", https://www.rainsalestraining.com/blog/the-8-buyerpersonas-and-how-to-sell-to-them, 2011, accessed Aug. 18, 2019, 6 pages.

Final Office Action from U.S. Appl. No. 15/040,653 dated Sep. 3, 2020, 14 pages.

* cited by examiner

TECHNIQUES FOR GENERATING A PSYCHOGRAPHIC PROFILE

TECHNICAL FIELD

This disclosure relates generally to computer-implemented methods and systems that generate a character profile (also known as a psychographic profile) for an individual.

BACKGROUND

It has become commonplace for marketers to tailor their marketing campaigns according to the group of people to which an advertisement will be presented. Typically, such tailoring includes dividing a broad market into segments of people who are perceived to share a common trait. The marketer can then design and implement marketing plans to reach those segments. Identifying such segments is often a challenge for marketers. Traditional techniques for segmenting intended markets utilize demographic information and transactional data. Demographic information for a person includes types of information that can be categorized and labeled, such as age, race, gender, income, religion, education, career, memberships, types and number of credit cards used, type of car, address, size of residence (rented or owned), and the number of residents in the household. Transactional data includes, for example, at least one of purchase data, product-return data, clickstream data, or the like.

Marketers employing these techniques can be left with inaccurate information on which to offer products that may appeal to potential customers' interests. This is largely because demographic information and transactional data merely identify people who have purchased a product or service. Using demographic and transactional data alone does not specify the reasons behind a person's purchase decisions. It is especially difficult for marketers to identify which new products may be more interesting or useful to potential consumers given the lack of transactional data for such products. The modern-day consumer is far more complicated than demographic information and transactional data alone suggest.

SUMMARY

According to certain embodiments, systems and methods are disclosed for generating a character profile (also known as a psychographic profile) for an individual. Using these character profiles enable marketers to personalize their efforts in a way that is more likely to engage certain segments of people who are perceived to share a common trait. In accordance with at least one embodiment, a character profile enables an individual to be filtered from a segment to be reached.

In some embodiments, user-input data including, but not limited to, a combination of textual data, past-purchase information, survey-response data, and/or clickstream data is obtained for an individual. Utilizing linguistic analysis techniques, the user-input data is analyzed to derive a number of character dimensions for the individual. For example, textual data (e.g., a social media post) is analyzed to identify certain types of words or language usage of the individual. The language usage and/or word types are used to consult a predefined linguistic lexicon (e.g., a mapping) to identify one or more character dimensions (e.g., traits) that are associated with the words and/or language usage. These identified character dimensions describe a character profile for the individual that is utilized (e.g., as input), along with past-purchase information of the individual, survey-response data of the individual, and/or clickstream data of the individual, to generate a statistical model.

For example, the statistical model is trained to identify various combinations of the input data and character dimensions that resulted in a purchase. The statistical model is configured to provide one or more outputs that correspond to a statistical likelihood that the individual will purchase a product. A second individual's user-input data is utilized with the trained statistical model to determine a statistical likelihood that a product will be interesting or useful to the second individual given the second individual's particular character profile, past-purchase information, and/or clickstream data. The statistical likelihood(s) determined by the model are useful to provide marketing that is more likely to be of interest to an individual, improving the overall shopping experience of the individual.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings, where.

DETAILED DESCRIPTION

Figure 1:
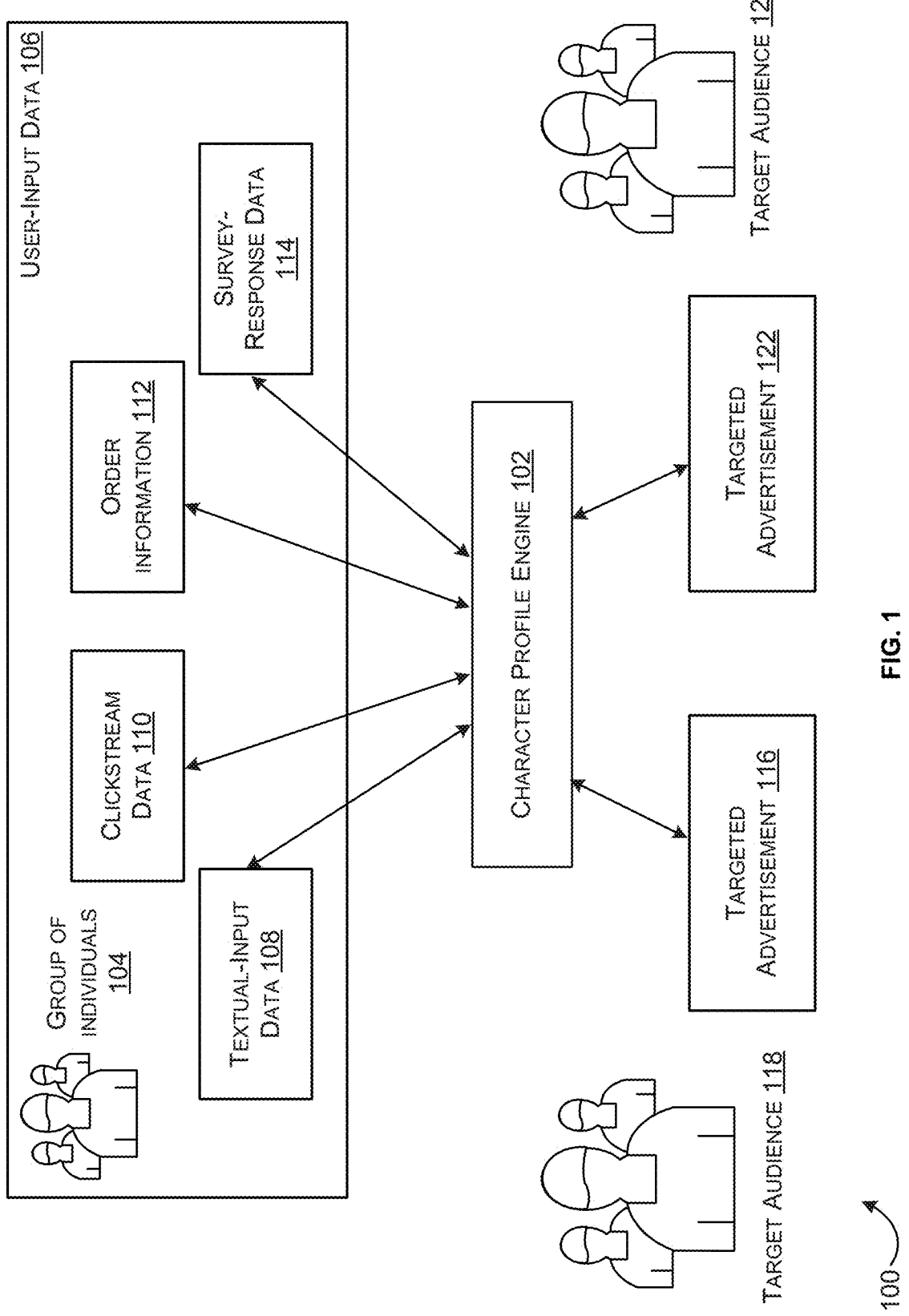
FIG. 1 is a block diagram depicting an example of a character profile engine that generates character profiles corresponding to a group of individuals, according to certain exemplary embodiments.

According to certain embodiments, systems and methods are disclosed for generating a character profile of the person. In some examples, a character profile (sometimes referred to as a "psychographic profile") may be utilized for determining a likelihood that a product will appeal to a person's interests or (e.g., a likelihood that the person may purchase the product in response if he or she encounters a particular marketing stimuli). As discussed above, existing segmenting techniques fail to account for the reasons behind a person's purchase decisions, where the reasons are related to character dimensions (sometimes referred to as "psychographic dimensions") of the user. Traditionally, demographic information utilized to personalize marketing information or content to a person focuses on everyday facts, like the person's age or gender. In contrast, character dimensions focus on the personality, values, opinions, attitudes, interests, and lifestyles of the person. Accordingly, these character dimensions are invaluable in identifying factors that can improve a person's shopping experience because they provide insight into the motivations behind the person's purchase decisions.

As used herein, a "character dimension" or "psychographic dimension" is intended to refer to a personality trait, a cognitive trait, or a situational trait of a person. A personality trait describes a characteristic or quality that forms an individual's distinctive persona and includes, but is not limited to, "openness", "conscientiousness", "extraversion", "agreeableness", and "neuroticism". A cognitive trait describes a behavioral predisposition of an individual and includes, but is not limited to "a need for information" and "a need for interaction." A person with "a need for information" cognitive trait seeks information regarding a product (e.g., delivery information, seller information, product/seller reviews, product demonstrations, product images, product details, etc.) over a threshold number of times prior to making a purchase decision. A person with "a need for interaction" cognitive trait provides data input related to interacting with other individual regarding a product (e.g., contacting a seller of the product, asking questions regarding the product from the seller and/or from reviewers, posting reviews about a previously-purchased product, etc.) over a threshold number of times. A "situational trait" reflects a consideration of an individual with respect to purchasing a product in a particular situation. Situational traits include, but are not limited to, "functional consciousness," "value consciousness," "social consciousness," and "shopping enjoyment." A person exhibiting a "functional consciousness" situational trait considers at least one of comfort, convenience, efficiency, or functionality of a product prior to making a purchase decision. A person exhibiting a "value consciousness" situational trait considers at least one of cost, usefulness of the product, purchase risk, seller quality, comparative standing of the product, perceived benefit of the product, or a review of the product prior to making a purchase decision. A person exhibiting a "social consciousness" situational trait considers at least one of diversity, variety, recency, uniqueness, or social status with respect to the product prior to making a purchase decision. A person exhibiting a "shopping enjoyment" situational trait considers at least one of safety, comfort, access, incentives, brand/manufacturer/provider loyalty, choice enjoyment, or satisfaction that the person associates with purchasing products.

In at least one embodiment a process is provided for determining a statistical likelihood that a person will purchase a product based on a character profile of the person. A "psychographic profile" or "character profile" is intended to refer to a set of character dimensions that are individually associated, to varying degrees, with a person. As a non-limiting example, a person is associated with a high degree of agreeableness (a personality trait), a high need for information (a compound trait), a high need for interaction (a compound trait), and a high degree of value consciousness (a situational trait). However, it should be appreciated that any suitable number or combination of the character dimensions described herein may be included in a character profile.

In accordance with an embodiment, a character profile for a person is derived based on user-input data. In the examples provided herein, the user-input data includes, but is not limited to, textual input data, clickstream data, order information, and survey-response data. "Textual input data," includes electronic communications submitted by the person that include text. The electronic communications include, for example, social media posts, product reviews, blogs, articles, papers, email messages, text messages, or the like. "Clickstream data," is intended to refer to information related to a person's Internet usage including, for example, what web pages he visited, how long he remained on each web page, which hyperlinks he selected, what promotional offer(s) have been provided to the user, and generally any information related to a succession of selections made by the person (e.g., mouse clicks, touch selections, etc.). "Order information," includes data indicating at least one of a quantity, a price, a purchase date, a frequency, etc. for an order (purchase/lease/loan) completed by a person. "Survey-response data," refers to responses provided by a person in response to a questionnaire. In at least some examples, the questionnaire provides queries regarding traits with which a person relates and queries directed to how the person believes he would feel or act given a situational hypothetical. Survey-response data may indicate a degree to which the user finds a statement accurate or inaccurate in describing his typical behaviors, feelings, or actions.

In order to train a statistical model, a group of people are presented a survey (e.g., a questionnaire) and response data is collected. A "statistical model," is a mathematical model that is configured to provide outcomes (e.g., classifications, labels, estimates, predictions, scores) from a set of input variables (e.g., word patterns, character dimensions, clickstream data, purchase information, etc.). The purpose of the survey is to ascertain known character dimensions of individuals of the group (e.g., if a person chose response "A" to question 1, they are an individual who is associated with character dimension "X"). A first statistical model is trained to identify character dimensions from user-input data. In some examples, word patterns are extracted from textual-input data (e.g., a social media post and/or product review of the user-input data) of an individual of the group. The extracted word patterns are utilized to consult a predefined linguistics lexicon (e.g., a mapping of word patterns/words/ language usage to one or more categories that are each associated with a character dimension). In some examples, other/additional user-input (e.g., clickstream data) is used to generate the first statistical model. For example, particular selections, double-clicks, and/or actions that highlight certain portions of a web page are each mapped to a character dimension. Once the character dimension(s) (e.g., model outputs) are obtained for an individual, the first statistical model is validated by comparing the outputs to the known character dimensions of the response data. Any suitable portion or combination of user-input data is used to train the first statistical model and a character profile is determined for each person in the group based on outputs of the first statistical model. A second statistical model is generated (e.g., using regression techniques) to identify relationships between character dimensions of a character profile and a final outcome (e.g., a statistical likelihood that a person will purchase a product, visit a webpage, etc.). In at least one example, the second statistical model is generated utilizing known machine learning techniques such as supervised-learning techniques, unsupervised learning techniques, and/or semi-supervised learning techniques. In essence, the word patterns, character dimensions, clickstream data, and/or purchase information of the group of people are used as input data to determine various combinations of such data that are known to have resulted in a purchase. The statistical model is trained with this known data so as to be configured to provide a prediction regarding whether another individual (for which less information is known) will make a purchase. Once the second statistical model is generated, historical user-input data from a subsequent person may be obtained. Historical user-input data is analyzed and the first statistical model is utilized to determine a character profile for the subsequent person. In some examples, the character dimensions of the character profile as well as any suitable portion of the historical user-input data for the subsequent person are provided as input for the second statistical model and an output is determined (e.g., a statistical likelihood that this person will purchase a product given the input values). In some examples, the character profile determined for the subsequent person is utilized by marketers in order to determine whether a particular marketing strategy will be effective with a group of people.

Several benefits are realized by utilizing the process described above, although the following benefits are not intended to be an exhaustive list. For example, it is challenging to ascertain various aspects of a person's personality when the person is not physically present or communicating in real time (e.g., over a phone). The Internet doesn't allow for observations such as body language and vocal usage so other methods must be employed to determine the personality and motivations of the Internet user. By determining a mapping that identifies correlations between word patterns and character dimensions, purchase predictions can be determined more accurately. This is because character dimensions are directed to identifying why a person makes purchase decisions. Predictive techniques that utilize demographic information tend to merely identify that, for example, 25-year-old women buy handbags more frequently than other demographic groups. While demographic information may be helpful in identifying that one should market handbags to 25-year-old women, it does not allow for more complicated marketing decisions to be made. For example, a marketer would not be able to utilize such demographic information to determine that a subset of 25-year-old women will likely be inclined to purchase a new item on the market for which little to no historical transaction data is available and/or that does not relate to handbags. As an example, using a character profile as described herein, the marketer is alerted that one woman, an introvert, purchases comparatively plain-looking products, while another woman, an extrovert often purchases flashy, eye-catching products. Having such knowledge allows the marketer to send person-specific communications/offers for respective women. As consumers are inundated more and more with messages and promotional offerings, tailoring such messages/promotional offerings is likely to generate higher response and/or conversion rates.

Additionally, 25-year-old women, and consumers in general, make decisions using widely different decision making processes and criteria. One 25-year-old woman, woman A, decides to purchase a handbag because the product description provided an abundance of details and because there were many reviews and/or product videos available. Woman A would likely have a high score associated with a compound trait related to "a need for information." Another 25-year-old woman, woman B, decided to purchase a handbag because the handbag was priced significantly less than similar handbags. Woman B would likely have a high score associated with a situational trait related to "value-consciousness." Utilizing demographic information, woman A and woman B, seem essentially, the same. However, by utilizing a statistical model trained on character dimensions, a marketer is informed that woman A is more likely than woman B to purchase a product based on an advertisement that features product ratings, a link to product reviews, and a detailed product description. Similarly, the marketer is informed that woman B is more likely than woman A to purchase a product based on pricing considerations. Using the statistical model trained on character dimensions, the marketer is able to more accurately reach an audience who is likely to be receptive to a particular marketing strategy, thus leading to an improved shopping experience for the customers/audience and increased profits for the marketer. The audience experience is enhanced due to more accurate predictions for when a marketing strategy will be of interest to the audience resulting in a reduction of unnecessary advertisements that clutter the user's online experience.

Referring now to the drawings, FIG. 1 is a block diagram 100 depicting an example of a character profile engine 102 that generates character profiles corresponding to a group of individuals 104. The character profiles are used by the character profile engine 102 to determine a likelihood that such individuals will purchase a product.

In accordance with at least one embodiment, the character profile engine 102 obtains user-input data 106 corresponding to the group of individuals 104. The user-input data 106 includes any suitable combination of textual-input data 108, clickstream data 110, purchase history data 112, or survey-response data 114. The character profile engine 102 derives character dimensions corresponding to the group of individuals 104 (or a subset of the group) from the user-input data 106. The character dimensions associated with a single individual of the group of individuals 104 determine that individual's character profile.

In one example, the profile engine 102 analyzes textual-input data 108 to determine or otherwise identify certain types of words or language usage of the individual. In some embodiments, the character profile engine 102 retrieves a mapping of language usage and/or word types to character dimensions, and uses the determined word or language usage for the individual to identify one or more corresponding character dimensions via the mapping. In another example, the profile engine 102 analyzes one or more of clickstream data 110, purchase history data 112, or survey-response data 114 to determine certain preferences or behavioral patterns that are implied by (but not necessarily explicit n) the clickstream data 110, purchase history data 112, or survey-response data 114. In some embodiments, the character profile engine 102 retrieves a mapping of preferences or behavioral patterns to character dimensions, and uses the determined preferences or behavioral patterns for the individual to identify one or more corresponding character dimensions via the mapping.

In at least one embodiment, the character profile engine 102 generates a statistical model for predicting when individuals of the group will purchase a product. The character profile engine 102 scores the group of individuals according to output provided by the statistical model. A user of the character profile engine 102 (e.g., a marketer) utilizes the scores to determine that a targeted advertisement 116 will produce a greater number of potential sales if presented to a target audience 118 than if the targeted advertisement 116 was presented to a target audience 120. In the example depicted in FIG. 1, the target audience 118 includes a subset of individuals from the group of individuals 104. The target audience 120 includes a different subset of individuals from the group of individuals 104. In at least one example, the target audience 118 includes individuals that share a common character dimension. Similarly, the target audience 120 includes individuals that share a common character dimension that is different from the shared dimension of the target audience 118.

Utilizing the character profile engine 102, the user may realize increased sales by becoming informed as to which advertisement is likely to prove effective with respect to a particular audience.

Figure 2:
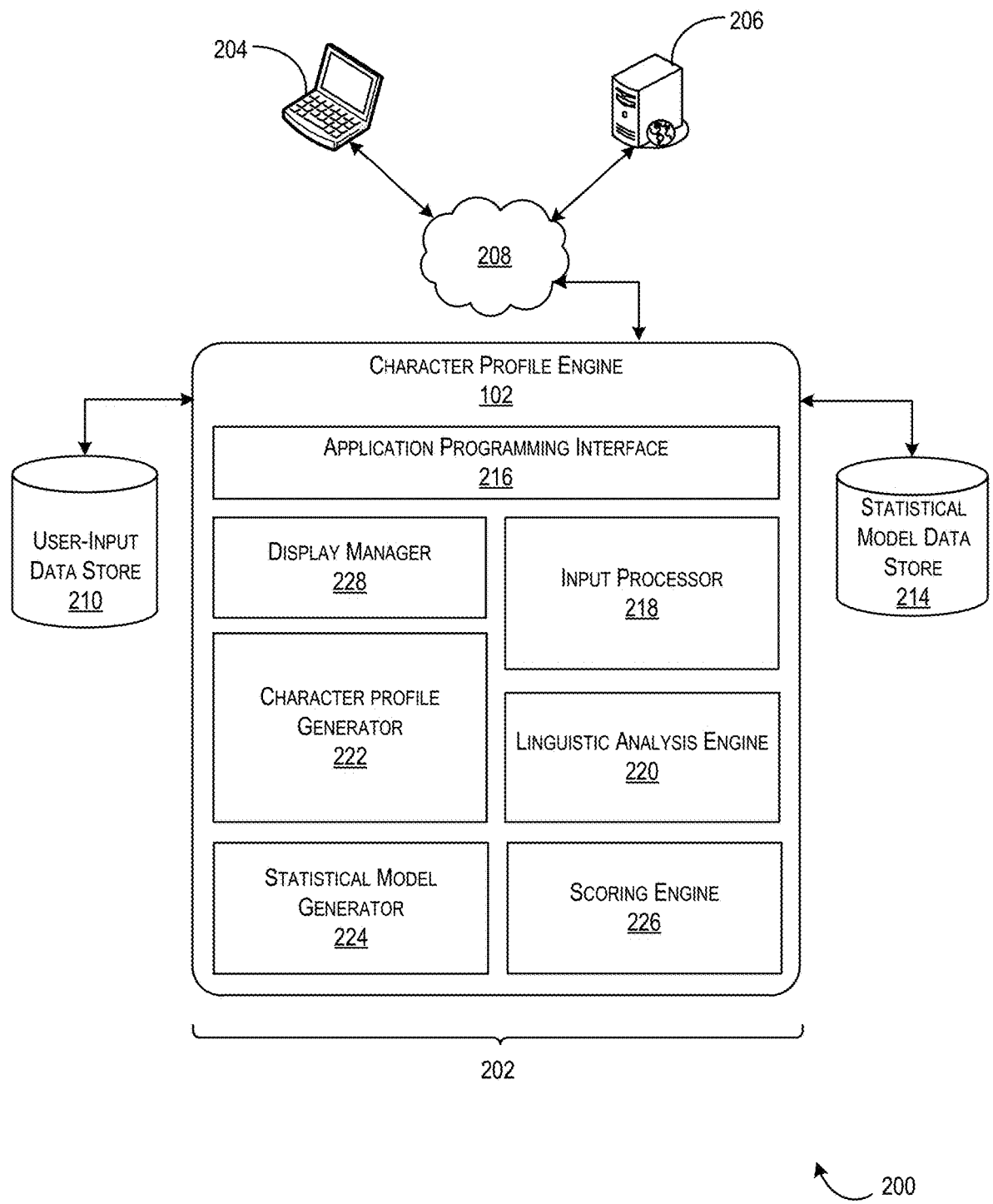
FIG. 2 is an example computer architecture of the character profile engine, including a plurality of modules that are utilized to provide various aspects of the character profile engine, according to certain exemplary embodiments.

FIG. 2 is an example computer architecture 200 of the character profile engine 102 of FIG. 1, including a plurality of modules 202 that are utilized to provide various aspects of the character profile engine 102, according to certain exemplary embodiments. The modules 202 are software modules, hardware modules, or a combination thereof. In some examples, the modules 202 are embodied on a computer readable medium and processed by a processor in any of the computer systems described herein. In some embodiments, any module or data store described herein are a service responsible for managing data of the type required to make corresponding calculations. The modules 202 are configured in the manner suggested in FIG. 2 or the modules 202 are configured in a different configuration. Alternatively, the modules are external to the character profile engine 102. In some examples, at least one of modules 202 is executed, in whole or in part, on user device 204 (e.g., a laptop) as part of an application executing on user device 204. Likewise, in some examples, a portion of the modules 202 are executed on remote computing device 206 (e.g., a server). In some examples, the user device 204 and/or the remote computing device 206 interact with the character profile engine 102 via network 208. The network 208 (and any network described herein) includes any appropriate set of communicatively-coupled computing devices and equipment that electronically transmit and receive data. Examples of the network 208 include (but are not limited to) an intranet, the Internet, a cellular network, a local area network, a wide area network, or any other such network or combination thereof.

In the embodiment shown in FIG. 2, a user-input data store 210, and a statistical model data store 214 are shown. It should be understood that data can be otherwise maintained, derived, or accessed from various data stores. Such data stores are either remote or local to the character profile engine 102. A combination of the data stores depicted in FIG. 2 are located on the remote computing device 206 and/or are located on the user device(s) 204. The character profile engine 102 includes various modules such as an application programming interface 216, an input processor 218, a linguistic analysis engine 220, a character profile generator 222, a statistical model generator 224, a scoring engine 226, and a display manager 228. In some examples, the modules 202 are combined in any suitable combination. Some functions of the modules 216, 218, 220, 222, 224, 226, and 228 are described below. However, for the benefit of the reader, a brief, non-limiting description of each of the modules is provided in the following paragraphs.

The application programming interface 216 is utilized by the character profile engine 102 to receive and/or transmit any suitable information (e.g., user-input data, character profile information, a statistical probability quantifying a statistical likelihood that an individual will make a particular purchase decision, etc.), for example, between the character profile engine 102 and the user device 204 via the network 208. Additionally, or alternatively, the application programming interface 216 is utilized to receive and/or transmit any suitable information between the remote computing device 206 and the character profile engine 102.

In accordance with at least one embodiment, the input processor 218 is configured to receive user-input data and store such input, for example, in user-input data store 210. In at least one example, user-input data for an individual is stored in a record associated with the individual so that the user-input data may be recalled at a later time. User-input data includes textual-input data, clickstream data, purchase data, and/or survey-response data.

In accordance with at least one embodiment, the linguistic analysis engine 220 is configured to extract one or more words from textual-input data obtained from the input processor 218 and/or the user-input data store 210. For example, one or more words may be extracted from the textual-input data according to one or more words specified in a lexicon. A lexicon, in this context, provides a mapping from the one or more words to a psycholinguistic category. One example lexicon which may be utilized is the Linguistic Inquiry and Word Count lexicon developed by Pennebaker and King in 1999. It should be appreciated that any suitable lexicon, including a user-defined lexicon, may be utilized. As a non-limiting example, a lexicon may map future tense words to a psycholinguistic category that indicates that the individual is future and goal oriented. Similarly, a lexicon may map past tense words to a psycholinguistic category that indicates that the user focuses on the past. In at least one example, the linguistic analysis engine 220 extracts words (e.g., past tense words) from the textual-input data because the lexicon indicates that the one or more words are mapped to a psycholinguistic category. In at least one example, the linguistic analysis engine 220 extracts words that indicate either future tense or past tense based on these words being included in the lexicon. The linguistic analysis engine 220 discards words that correspond to more than one psycholinguistic category. A resultant word list may be provided by the linguistic analysis engine 220 to the character profile generator 222.

In accordance with at least one embodiment, the character profile generator 222 generates a statistical model for determining a character profile for an individual from the word list obtained from the linguistic analysis engine 220. For example, the statistical model is trained to determine that a particular character dimension (or a set of character dimensions) is indicated by the one or more words of the word list. In at least one embodiment, the character profile generator 222 may validate the statistical model using survey-response data (known information) for the individual. As a non-limiting example, a mapping (e.g., a response matrix) is utilized. The mapping indicates that a particular response is associated with a particular character dimension. Accordingly, survey-response data provides a known character profile for a user. This known character profile derived from the survey-response data is utilized by the character profile generator 222 to determine whether the generated statistical model is accurate in providing a character profile using the textual-input data. In at least one embodiment, the character profile generator 222 stores a character profile of an individual in the user-input data store 210 in a record associated with an individual. The character profile generator 222 stores the statistical model for determining a character profile in the statistical model data store 214, a data store configured to store such information.

In accordance with at least one embodiment, the character profile generator 222 generates a statistical model for determining a character profile for an individual from user-input data (e.g., textual-input data and clickstream data) obtained from the user-input data store 210. For example, the statistical model is trained to determine that a particular character dimension (or a set of character dimensions) is indicated by the user-input data. In at least one embodiment, the character profile generator 222 may validate the statistical model using survey-response data (known information) for the individual as described above. As a non-limiting example, text input by an individual as well as their clickstream data (indicating search queries entered, webpages visited, time spent browsing said webpages, hyperlinks selected, etc.) provide the input variables used to generate the statistical model. As a non-limiting example, the statistical model is utilized to determine that an individual who submits one or more queries related to a particular product exhibits a "need for information" cognitive trait. The statistical model further determines that an individual that spends over a threshold amount of time viewing a webpage that includes product information exhibits a "need for information" cognitive trait. The statistical model further determines, for example, that an individual that provides one or more reviews for previously-purchased items, corresponds with a seller regarding one or more products over a threshold value, and/or submits one or more requests for information regarding a product from other reviewers exhibits a "need for interaction" cognitive trait. In at least one embodiment, the character profile generator 222 stores a character profile of an individual in the user-input data store 210 in a record associated with an individual. The character profile generator 222 stores the statistical model for determining a character profile in the statistical model data store 214, a data store configured to store such information.

In accordance with at least one embodiment, the statistical model generator 224 is utilized to generate a statistical model for predicting a final outcome (e.g., a statistical likelihood that an individual will purchase a product, will visit a webpage, etc.) based on, for example, character dimensions of a character profile. The final outcome corresponds to any suitable key performance indicator of the user (e.g., a marketer). In accordance with at least one embodiment, the statistical model generator 224 obtains a character profile of an individual (e.g., from the user-input data store 210, from the character profile generator 222, etc.). Corresponding character dimensions of the character profile are used as input in order to train the statistical model to determine the final outcome. For example, a statistical model may be generated to predict when an individual will purchase a product based on the character profile of the individual. In at least one example, the product relates to particular marketing content from the marketing data store 212. In a similar manner as described above, a statistical model may be generated to predict when an individual will visit a particular webpage (e.g., a product detail page associated with a hyperlink included in a promotional offer). In at least one example, order information and/or clickstream data of the group of individuals is utilized to validate the statistical model. In an example where the statistical model is generated to predict whether the individual will purchase a product, order information from the user-input data may be utilized to validate whether the outcome predicted by the statistical model (e.g., the individual will purchase the product) matches the outcome indicated in the order information (e.g., the individual purchased the product).

In accordance with at least one embodiment, the statistical model generator 224 generates a number of statistical models based on a demographic input of an individual and a character dimension of the individual. For example, a first statistical model may be generated based on demographic information of the individual (e.g., a combination of an age, an income, or a level of education associated with an individual) and a desired final outcome (e.g., the individual will purchase a product). A second statistical model may be generated based on demographic information of the individual and a number of cognitive traits (e.g., corresponding to a "need for information" and/or "a need for interaction") and a desired final outcome. A third statistical model may be generated based on demographic information of the individual, a number of cognitive traits, a number of situational traits (e.g., functional consciousness, value consciousness, and social consciousness), and a desired final outcome. A fourth statistical model may be generated based on demographic information of the individual, a number of cognitive traits, a number of situational traits (e.g., functional consciousness, value consciousness, social consciousness, and shopping enjoyment), and a desired final outcome. A fifth statistical model may be generated based on demographic information of the individual, a number of cognitive traits, a number of situational traits (e.g., functional consciousness, value consciousness, social consciousness, and shopping enjoyment), a number of personality traits (e.g., neurotic, agreeable, open, conscientious, extravert), and a desired final outcome. The various statistical models may be scored according to accuracy in predicting the final outcome. A highest scored statistical model may be selected and utilized by the character profile engine 102 in order to identify a number of individuals (e.g., a target audience for which particular marketing content is best suited).

In accordance with at least one embodiment, the scoring engine 226 provides a ranking of a number of individuals according to outputs of the statistical model generated by the statistical model generator 224. For example, individuals may be scored according to a likelihood that the individual will purchase a product. The scoring engine 226 may rank the individuals according to the score resulting in individuals with a higher statistical likelihood of purchasing the product will be ranked higher than individuals with a lower statistical likelihood of purchasing the product. The scoring engine 226 may provide the ranking to the display manager 228.

In accordance with at least one embodiment, the display manager 228 is configured to provide the ranking to a user of user device 204. Additionally, or alternatively, the display manager 228 provides the ranking to the remote computing device 206. In at least one example, the display manager 228 is configured to provide a top number of individuals (e.g., the one hundred highest-ranked individuals of the ranking) for display or storage. Data provided by the display manager 228 may include an indication one or more character dimensions determined exhibited by the ranked individual.

Figure 3:
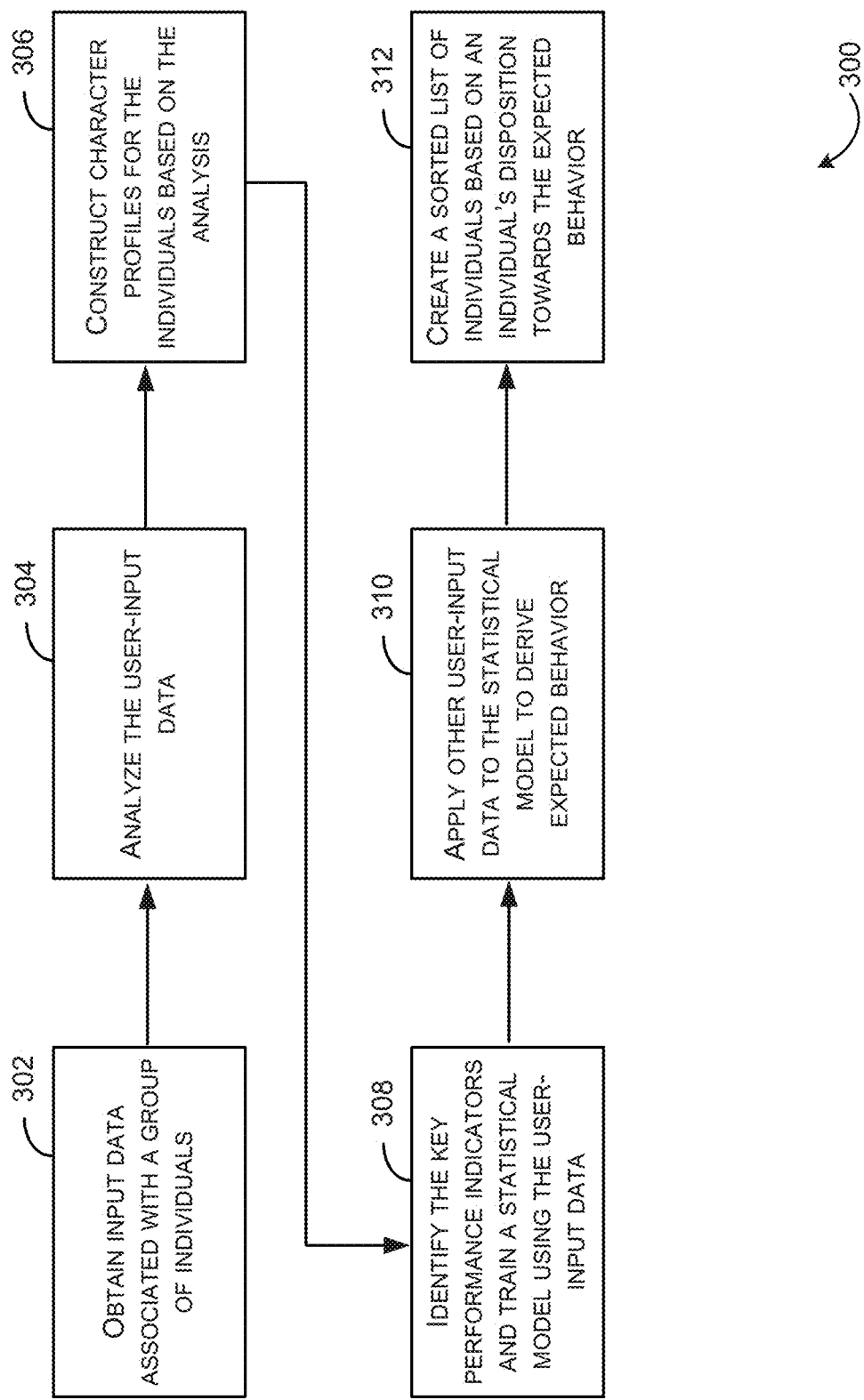
FIG. 3 is a flow chart depicting an example process for creating a sorted list of individuals using the character profiles of the individuals, according to certain exemplary embodiments of the character profile engine.

FIG. 3 is an flow chart depicting an example process 300 for creating a sorted list of individuals using the character profiles of the individuals, according to certain exemplary embodiments of a character profile engine (e.g., the character profile engine 102 of FIG. 1). The process 300 may begin at block 302, where user-input data associated with a group of individuals is obtained. The user-input data, in some examples, is obtained from one or more data stores responsible for storing such information. Additionally, or alternatively, the user-input data may be obtained by utilizing a program or automated script (e.g., a web crawler, a web spider, a web robot, etc.) to browse and extract data from a network page (e.g., a social media webpage, a webpage that is maintained by an electronic marketplace provider, a retail webpage, etc.).

At block 304, the user-input data is analyzed. In at least one example, one or more words may be extracted from the user-input data of a particular individual. A histogram may be generated corresponding to the one or more extracted words and a number of lexical categories. In at least one example, the histogram is generated based on a predefined mapping of a word to a lexical category. The lexical category, in some cases, is associated with a character dimension. As a non-limiting example, the histogram may be generated from textual-input data (e.g., social media posts, product reviews submitted by the individual, etc.). Additionally, or alternatively, a response matrix may be generated from an individual's survey-response data (e.g., answers given in response to a survey). A response matrix associates a particular response of the individual's survey response data with a character dimension.

At block 306, a number of character profiles are constructed for the individuals based on the analysis conducted at block 304. The character profiles may each include a number of character dimensions. As a non-limiting example, one or more character dimensions of a particular individual's character profile are quantified based on the histogram and/or response matrix generated at block 304.

At block 308, one or more key performance indicators (e.g., a number of webpage visits, a number of conversions, etc.) are identified (e.g., corresponding to a desired final outcome) and a statistical model is trained using the user-input data.

At block 310, other user-input data (e.g., corresponding to user-input data associated with an individual that was not utilized to train the statistical model) is applied to the statistical model to derive expected behavior (e.g., indicating that the individual will purchase a product that has been recently released). For example, the statistical model, in some cases, produces a number of values corresponding to individual character dimensions of an individual (e.g., a character profile for the individual). In some examples, the statistical model produces character profiles corresponding to any suitable number of individuals.

At block 312, a sorted list of individuals is created based on an individual's disposition towards the expected behavior derived at block 310. In a non-limiting example, character profiles of a number of individuals are scored according a statistical likelihood that an individual with the particular character dimensions included in the individual's character profile will conform to an expected behavior (e.g., purchase a newly-released product). In some examples, character profiles with higher scores (e.g., indicating a higher likelihood that the individual will purchase a product that an character profile with a lower score) are ranked higher in the list than character profiles with lower scores. The list, in some examples, includes identities of the individuals associated with the ranked character profiles. In at least one example, the list includes both the identities of the individuals as well as the ranked character profiles of the individuals.

Figure 4:
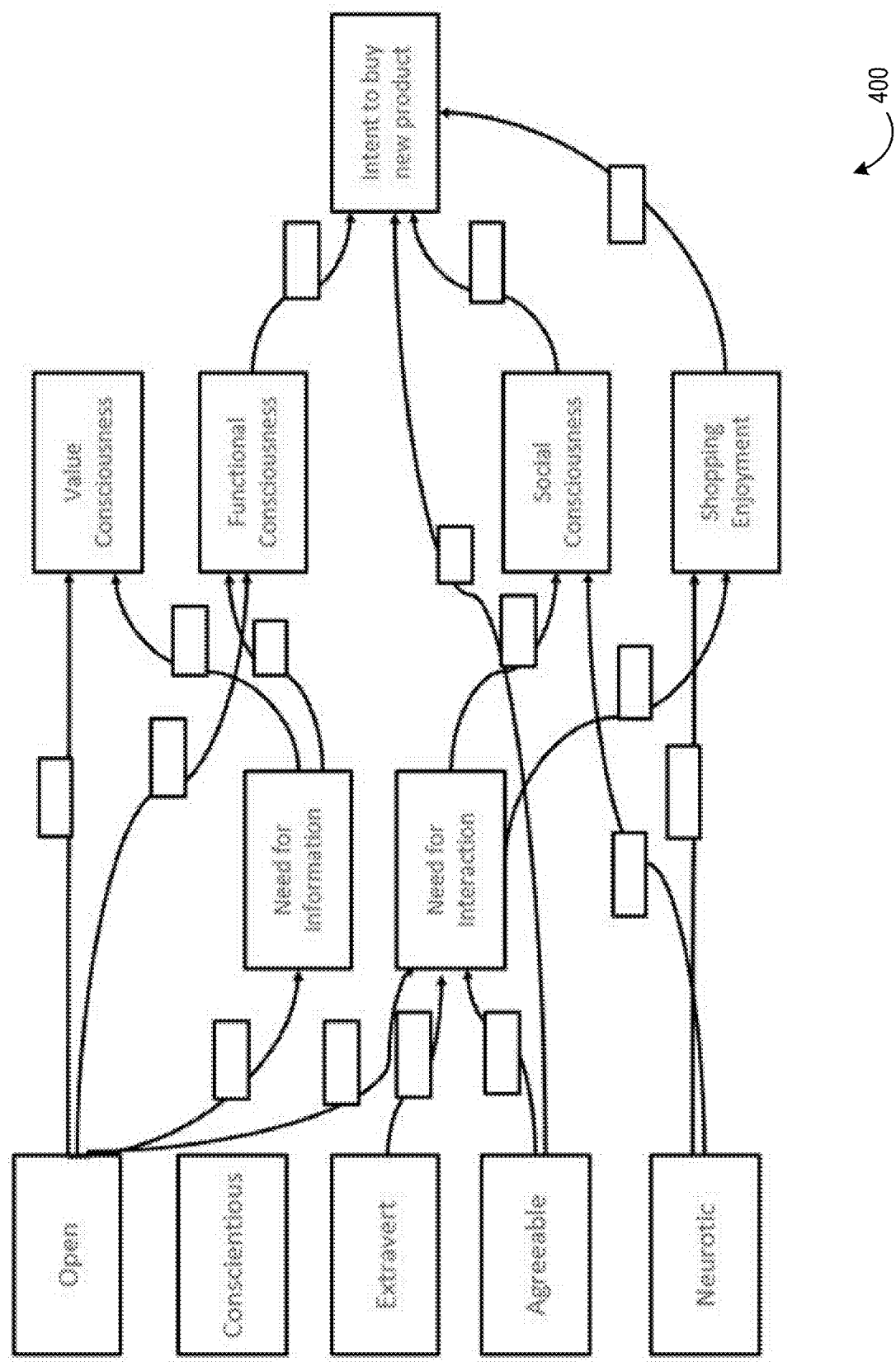
FIG. 4 is a schematic diagram for depicting a number of weights associated with character dimensions used to generate a statistical model, according to certain exemplary embodiments of the character profile engine.

FIG. 4 is a schematic diagram for depicting a number of weights (not shown) associated with character dimensions used to generate a statistical model 400, according to certain exemplary embodiments of character profile engine 102 of FIG. 1. In at least one example, the weights correspond to a statistical relationship between one or more predictor variables (e.g., one or more character dimensions) and a response variable (e.g., a statistical likelihood that an individual will make a particular purchasing decision) of a statistical model. The weights may be generated using regression analysis techniques during a process for generating a statistical model. A statistically significant weight indicates that a predictor (e.g., a particular character dimension) is likely to be a meaningful addition to the model because changes in the predictor are related to changes in the response variable. Conversely, a statistically non-significant weight indicates that changes in the predictor are not associated with changes in the response variable.

In at least one example, the weights represent the mean change in the response variable for a unit of change in the predictor variable while holding other predictors in the statistical model constant. Regression techniques that generate such weights provide statistical control in that each predictor variable is isolated from other predictor variables of the statistical model.

In the schematic diagram of FIG. 4, weights can be depicted that are informative about the relation among the character dimensions. For example, when a weight is positive, there is a positive relationship between the two character constructs. When a weight is negative, it is expected that there is an inverse relationship between the two character dimensions. In an illustration with one dataset, it is found that personality traits alone do not appear sufficient to accurately measure or predict an individual's inclination to purchase a novel product, and the addition of compound and situational traits can improve the variance explained up to threefold.

Figure 5:
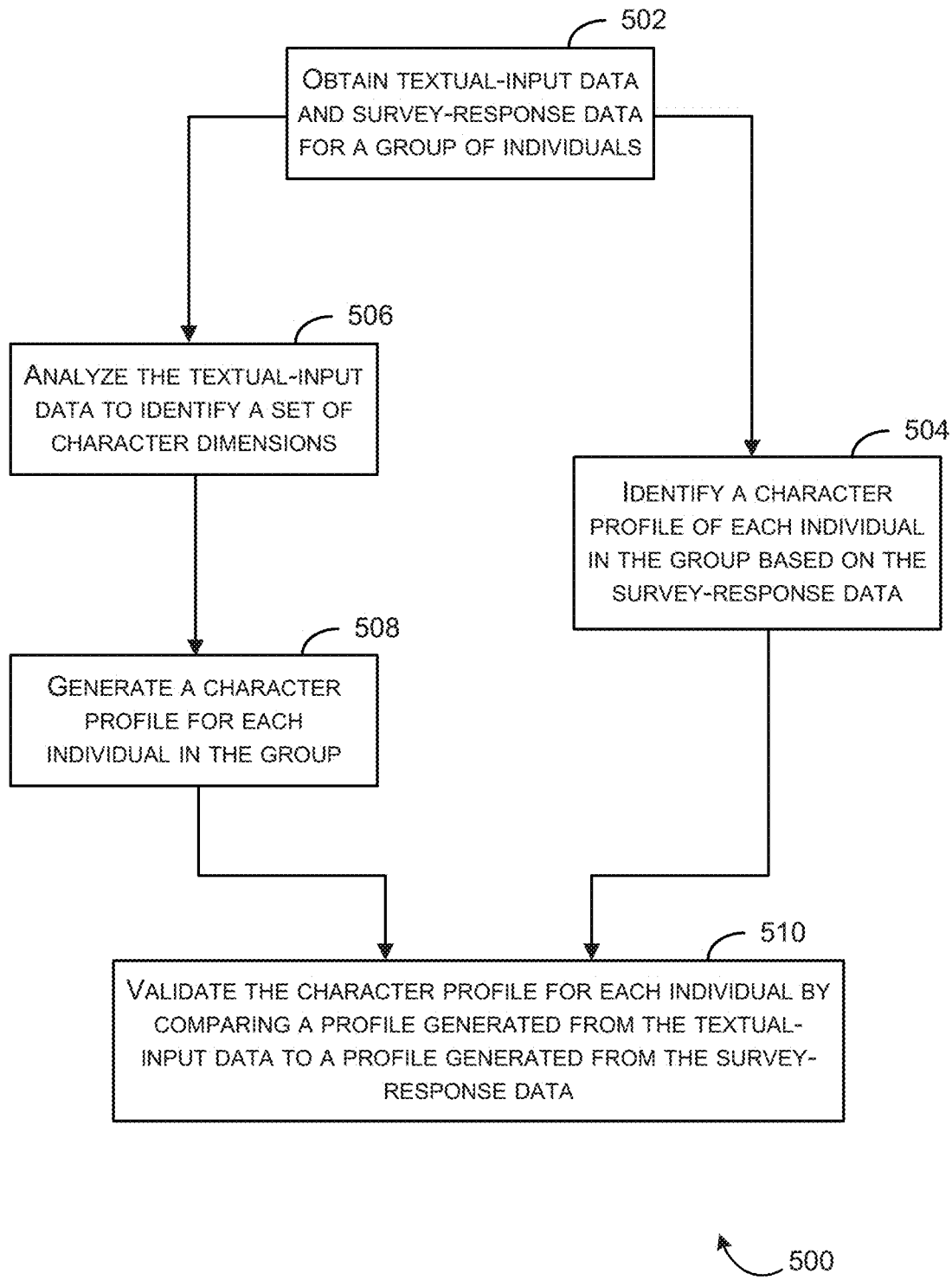
FIG. 5 is a flow chart depicting an example process for validating a character profile generated using textual-input data, according to certain exemplary embodiments of the character profile engine.

FIG. 5 is a flow chart depicting an example process 500 for validating a character profile generated using textual-input data, according to certain exemplary embodiments of character profile engine 102 of FIG. 1. The process 500 may begin at 502 where textual-input data and survey-response data for a group of individuals may be obtained. At block 504, a character profile is identified for each individual of the group based on the survey-response data. In at least one example, a mapping (e.g., a response matrix that specifies a relationship between a particular response of the survey-response data and a character dimension) is utilized to determine that an individual provided a response associated with a particular character dimension. In at least one example, a histogram may be generated using the mapping. The histogram, in some examples, indicates a number of times that a response submitted by an individual corresponds to a particular character dimension.

At block 506, the textual-input data is analyzed to identify a set of character dimensions. At block 508, a character profile is generated (e.g., using a statistical model trained by the textual-input data) for each individual in the group. For example, a character profile is generated (e.g., by the statistical model) for a particular individual based on the set of character dimensions identified for the individual at block 506.

At block 510, the character profile for each individual is validated. In at least one example, such validation includes comparing a character profile of an individual generated from the textual-input data to the character profile of the same individual generated from the survey-response data. If the character profiles for an individual generated at block 504 and at block 508 are within a threshold similarity, then the character profile generated from the textual-input data is determined to be valid. Consequently, the analysis techniques used to analyze the textural-input data (e.g., linguistic analysis techniques, lexicon comparison, etc.) are also determined to be accurate at identifying the set of character dimensions. Conversely, if the character profiles for an individual, generated at block 504 and at block 508 are not within a threshold similarity, then the character profile is found to be invalid.

Figure 6:
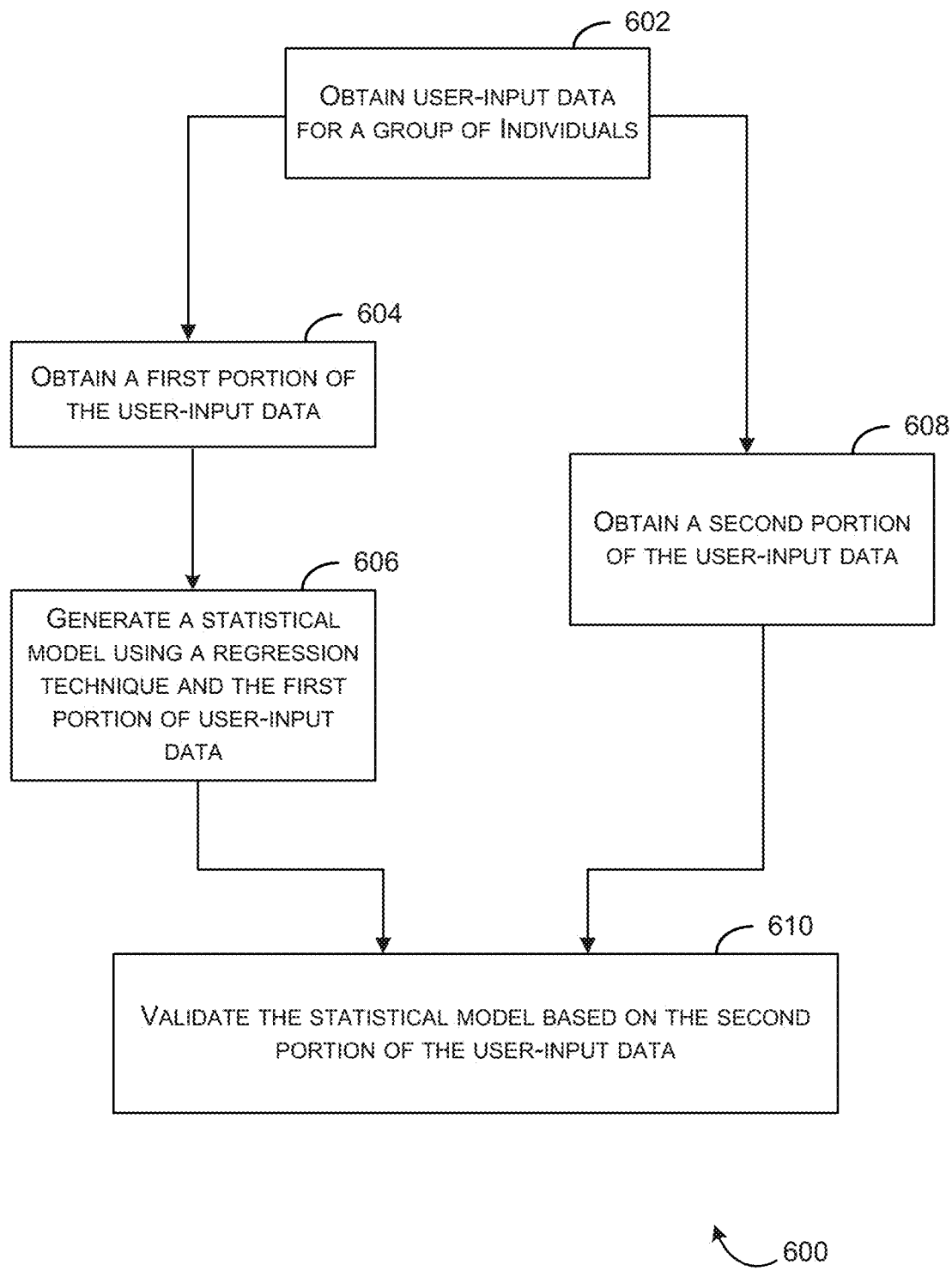
FIG. 6 is a flow chart depicting an example process for validating a statistical model that provides a character profile for an individual based on user-input data, according to certain exemplary embodiments of the character profile engine.

FIG. 6 is a flow chart depicting an example process 600 for validating a statistical model that provides a character profile for an individual based on user-input data (e.g., textual-input data, clickstream data, order information, etc.), according to certain exemplary embodiments of the character profile engine 102 of FIG. 1. The process 600 begins at block 602, where the user-input data for the group of individuals in obtained. At block 604, a first portion (e.g., two thirds) of the user-input data is obtained. It should be appreciated that any suitable portion of the user-input data may be utilized. In at least one example, the first portion of the user-input data is associated with a first set of individuals of the group of individuals.

In at least one example, a statistical model is generated using a regression technique and the first portion of user-input data obtained at block 604. In a non-limiting example, the user-input data is utilized to determine a number of weights corresponding to a set of character dimensions (e.g., such as the weights described above in connection with FIG. 4). An individual weight associated with a particular character dimension indicates a relationship between an attribute of the user-input data and a character dimension. The statistical model may output a probability value (or a set of probability values) that quantify an extent to which the individual exhibits a particular character dimension (or a set of character dimensions).

At block 608, a second portion (e.g., one third) of the user-input data is obtained (e.g., survey-response data). It should be appreciated that the second portion of the user-input data constitutes any suitable portion of the user-input data. In at least one example, the second portion of the user-input data is associated with the group of individuals.

At block 610, the statistical model generated at block 606 is validated based on the second portion of the user-input data obtained at block 608. For example, the second portion of the user-input data is applied to the statistical model in order to determine character profiles for the group of individuals. The character profiles generated from the first portion of user-input data are compared to the character profiles generated from the second portion of the user-input data in order to determine an extent to which the statistical model is accurate at determining a character profile based on user-input data.

Figure 7:
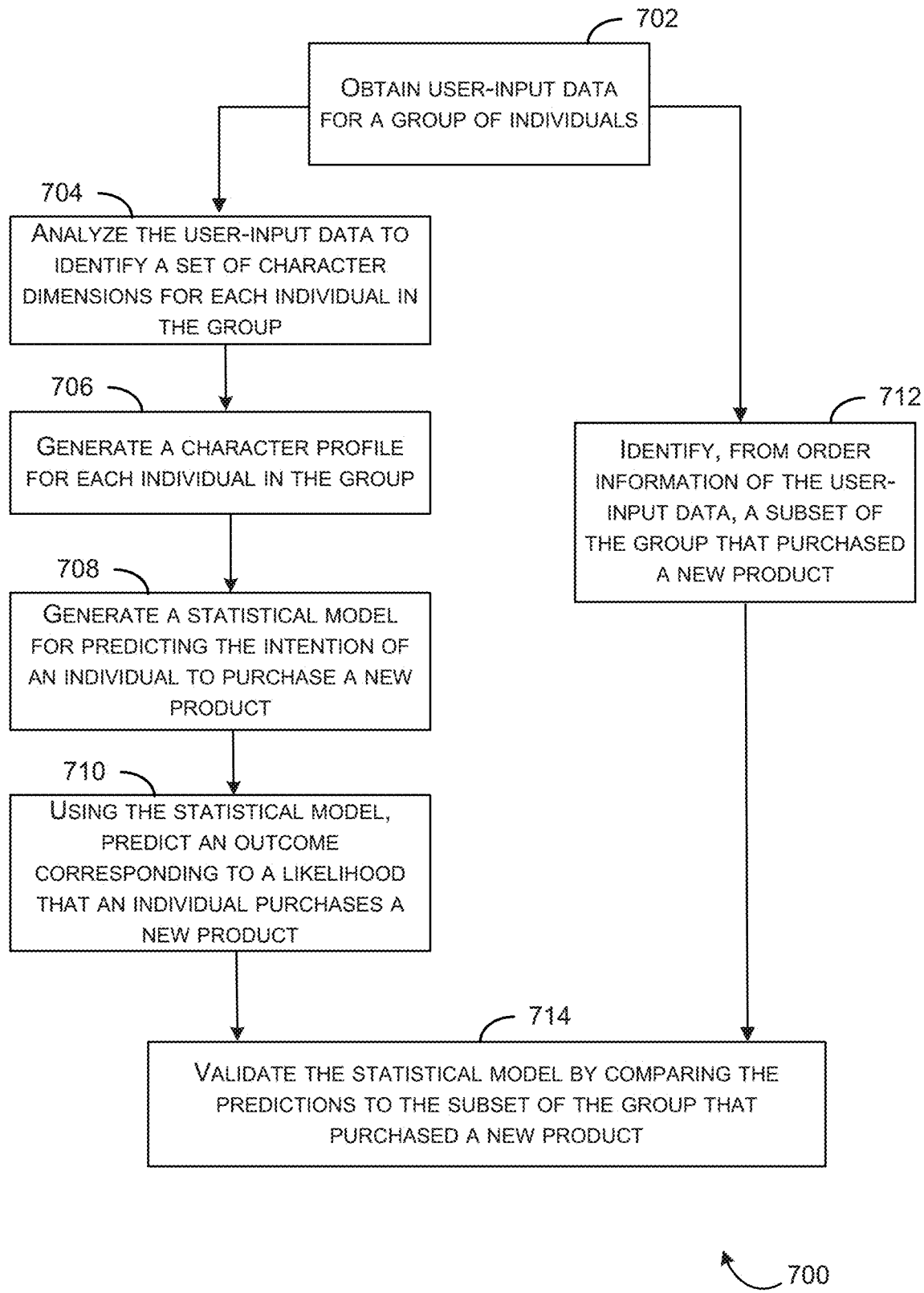
FIG. 7 is another flow chart depicting an example process for validating a statistical model for predicting an intention of an individual, according to certain exemplary embodiments of the character profile engine.

FIG. 7 is another flow chart depicting an example process 700 for validating a statistical model, according to certain exemplary embodiments of the character profile engine 102 of FIG. 1. The process 700 may begin at block 702 where user-input data for a group of individuals may be obtained.

The user-input data may be analyzed at block 704 to identify a set of character dimensions for each individual in the group. The set of character dimensions may be identified, for example, utilizing the processes described above in connection with FIGS. 5 and/or 6. A character profile may be generated for each individual in the group at block 706.

In accordance with at least one embodiment, a statistical model for predicting the intention of an individual to purchase a new product may be generated at block 708. For example, the character profiles of the individual, generated at block 706, may be used as input in order to generate the statistical model at block 708. It should be appreciated that although this example specifically contemplates predicting an intent to purchase a new product, any suitable outcome may be predicted (e.g., an outcome associated with any suitable key performance indicator).

The flow may proceed to block 710, where the statistical model is used to predict an outcome corresponding to a likelihood (e.g., a statistical probability value) that an individual purchases a new product.

At block 712, a subset of the group that purchased new products may be identified. In at least one example, the subset of the group may be identified from order information of the user-input data.

At block 714, the statistical model may be validating by comparing the predictions (e.g., output of the statistical model indicating that an individual will purchase a new product) with the identified subset identified at block 712 that actually purchased a new product.

Figure 8:
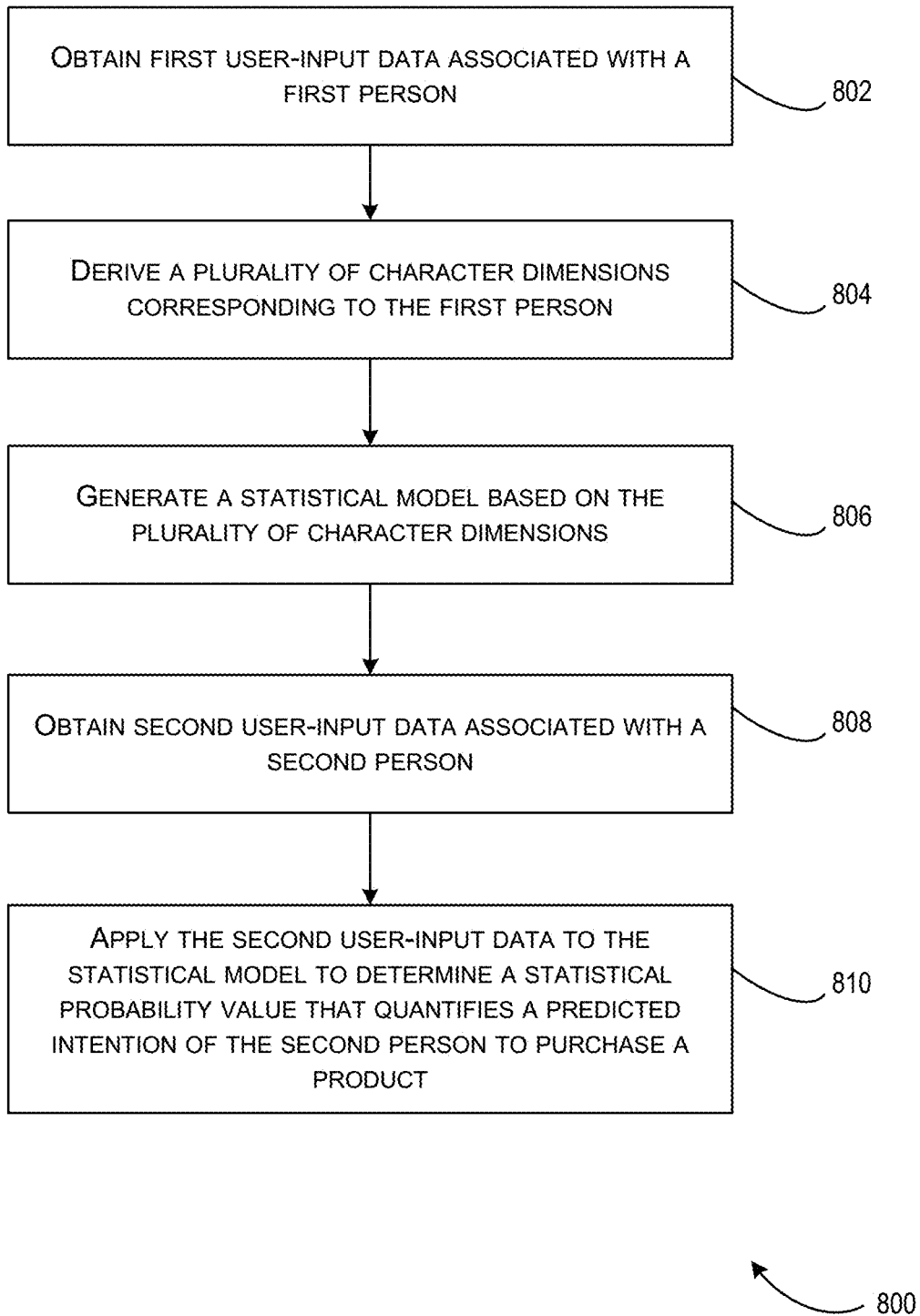
FIG. 8 is a flow chart depicting an example process for predicting an intention of a person to purchase a product, according to certain exemplary embodiments of the character profile engine.

FIG. 8 is a flow chart depicting an example process 800 for predicting an intention of a person to purchase a product, according to certain exemplary embodiments of the character profile engine 102. The process 800 may begin at 802 where first user-input data is obtained (e.g., by the input processor 218 of FIG. 2). In at least one example, the first user-input data is associated with a first user. The first user-input data may include any suitable combination of textual-input data, clickstream data, order information, or survey-response data. In at least some examples, the textual-input data comprises a communication authored by the first person. An electronic communication, as included herein, comprises at least one of a social media post, a product review, a blog, an article, a paper, an instance of electronic mail, or a text message, for example. The first user-input data may be previously-stored information (e.g., stored in the user-input data store 210 of FIG. 2. In at least one example, the first user-input data is received by the input processor 218.

At block 804, a plurality of character dimensions corresponding to the first person is derived (e.g., by the character profile generator 222 of FIG. 2). In at least one example, deriving the plurality of character dimensions is based on the first user-input data. The plurality of character dimensions (e.g., a character profile of the first person), in at least one example, individually corresponds to at least one of a personality trait (e.g., a big five personality trait), a compound trait (e.g., the need for interaction, the need for information), or a situational trait (e.g., functional consciousness, value consciousness, social consciousness, or shopping enjoyment).

At block 806, a statistical model is generated (e.g., by the statistical model generator 224 of FIG. 2) based on the character profile of the first user-input data. In at least one example, the statistical model is generated based on the character dimensions of the character profile of the first user-input data.

At block 810, the second user-input data is applied to the statistical probability model to determine a statistical probability value that quantifies a predicted intention of the second person to purchase the product.

Figure 9:
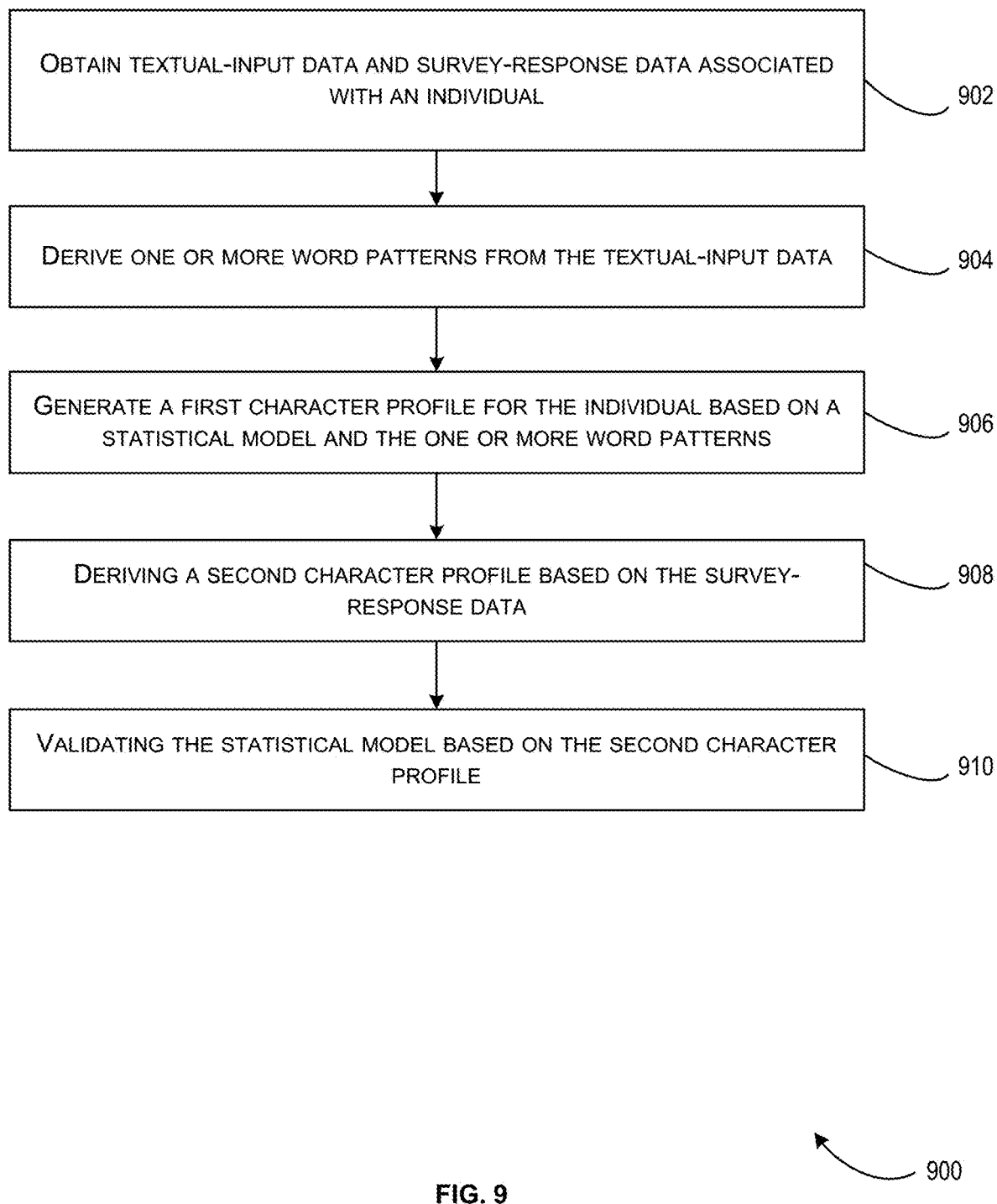
FIG. 9 is a flow chart depicting an example process for deriving a character profile for an individual, according to certain exemplary embodiments of the character profile engine.

FIG. 9 is a flow chart depicting an example process 900 for deriving a character profile for an individual, according to certain exemplary embodiments of the character profile engine 102 of FIG. 1. The process 900 may begin at 902 where textual-input data and survey-response data associated with an individual is obtained (e.g., by the input processor 218 of FIG. 2). In at least one example, the textual-input data is associated with a first user. In at least some examples, the textual-input data is based on a communication authored by the first person. An electronic communication, in at least one example, corresponds to at least one of a social media post, a product review, a blog, an article, a paper, an instance of electronic mail, or a text message, for example. The first user-input data may be previously-stored information (e.g., stored in the user-input data store 210 of FIG. 2). In at least one example, the first user-input data is received by the input processor 218.

At block 904, one or more word patterns are identified from the textual-input data (e.g., by the linguistic analysis engine 220 of FIG. 2). In a non-limiting example, a number of linguistic analysis techniques are applied to the textual-input data. For example, a (predetermined or user-specified) lexicon is obtained and a number of word patterns referenced in the lexicon are identified. The linguistic analysis engine 220 identifies one or more word patterns from the textual-input data that correspond to a word pattern referenced in the lexicon using a linguistic analysis technique (e.g., an algorithm for word stemming, an algorithm for identifying syntactic units (such as words, groups, clauses or textual units), etc.).

At block 906, a first character profile for the individual is generated (e.g., by the character profile generator 222 of FIG. 2) based on a statistical model and the one or more word patterns derived at block 904. The statistical model generated (e.g., by the character profile generator 222) is configured to represent a relationship between a word pattern of the textual-input data and a particular character dimension. As a non-limiting example, the statistical model identifies that an individual's use of future tense when inputting text indicates that the individual is forward-thinking. Accordingly, such word patterns (e.g., indicating the use of future tense) are identified by the statistical model as being indicative of an individual who exhibits a situational trait of "social consciousness."

At block 908, a second character profile is derived based on the survey-response data (e.g., by the character profile generator 222). In at least one example, the survey-response data is associated with a response matrix that maps a particular response to a particular character dimension. By determining a particular character dimension associated with each response of the survey-response data, a character profile is derived for the individual.

At block 910, the statistical model is validated (e.g., by the statistical model generator 224) based on the second character profile. In a non-limiting example, the statistical model has generated the first character profile at block 906. The first character profile generated from the statistical model is compared to the second character profile derived from the survey-response data. If the first and second character profiles are similar within a threshold value, then the statistical model is determined to be valid. If the first and second character profiles are not similar within the threshold value, then the statistical model is determined to be invalid. In at least some examples, a statistical model that is determined to be invalid is adjusted (e.g., one or more internal weights is adjusted within the statistical model, an internal weight corresponding to a character variable as depicted in FIG. 4).

Figure 10:
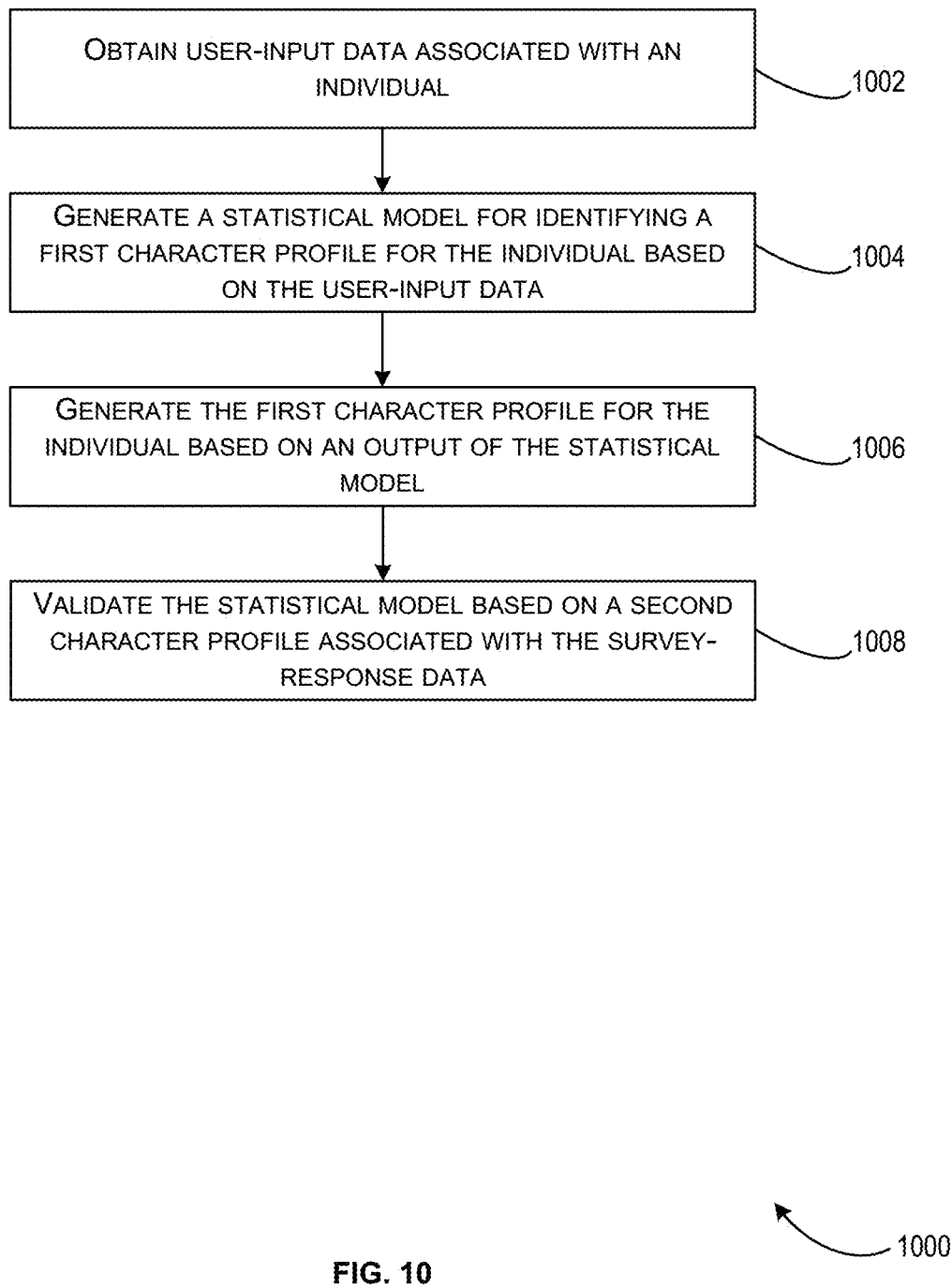
FIG. 10 is a flow chart depicting an additional example process for deriving a character profile for an individual, according to certain exemplary embodiments of the character profile engine.

FIG. 10 is a flow chart depicting an additional example process 1000 for deriving a character profile for an individual, according to certain exemplary embodiments of the character profile engine 102 of FIG. 1. The process 1000 may begin at 1002, where user-input data associated with an individual is obtained.

At block 1004, a statistical model is generated for identifying a first character profile for the individual based on the user-input data. In at least one example, the character profile comprises a plurality of character dimensions that individually correspond to at least one of a personality trait, a compound trait, or a situational trait of the individual. In at least one example, a compound trait describes a behavioral predisposition of the individual, while a situational trait reflects a consideration of the individual with respect to purchasing a product in a particular situation (e.g., given particular attributes associated with a promotional offer presented to the individual, given a discount price with respect to prices of similar products, given a number of product reviews indicating that the product is easily breakable, etc.).

At block 1006, the first character profile is generated for the individual based on an output of the statistical model. An output of the statistical model, in some examples, corresponds to the character profile of an individual. In at least one example, an output of the statistical model corresponds to a plurality of character dimensions of an individual (e.g., scores associated with the character dimensions of the individual that are ascertained based on the output of the statistical model). The plurality of character dimension scores, in at least one example, are combined to form a character profile for the individual.

At block 1008, the statistical model generated at block 1004 is validate based on a second character profile associated with the survey-response data. For example, the survey-responses data comprises one or more responses given by the individual in one or more survey questions. A response may map, or otherwise correspond, to a particular character dimension. In at least one example, a predefined map is utilized to map the response to the particular character dimension. For each response that indicates a particular character dimension, a count may be increased for the character dimension. Upon determining a character dimension associated with each response and incrementing a corresponding count accordingly, the second character profile may be determined based on the corresponding count. The first character profile generated from the statistical model is compared to the second character profile generated from the survey-response data. If the first and second character profiles are similar within a threshold value, then the statistical model is determined to be valid. If the first and second character profiles are not similar within the threshold value, then the statistical model is determined to be invalid. In at least some examples, a statistical model that is determined to be invalid is adjusted (e.g., one or more internal weights is adjusted within the statistical model, an internal weight corresponding to a character variable as depicted in FIG. 4).

Exemplary Computing Environment

Figure 11:
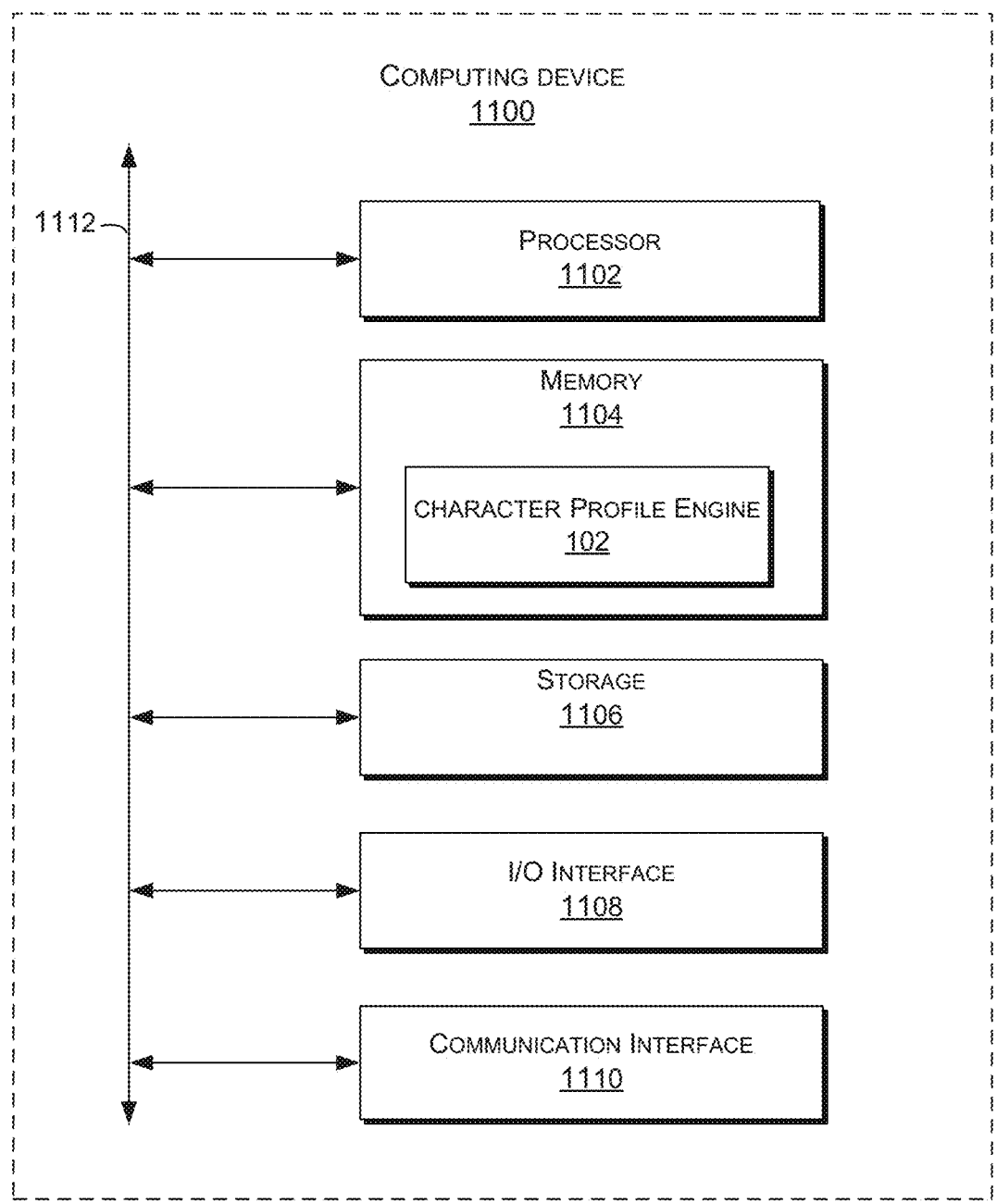
FIG. 11 is a block diagram depicting an example of a computing system that executes the character profile engine for enforcing usage policies for data according to certain exemplary embodiments.

Any suitable computing system or group of computing systems can be used to implement the techniques and methods disclosed herein. For example, FIG. 11 is a block diagram depicting examples of implementations of such components. The computing device 1100 can include a processor 1102 that is communicatively coupled to a memory 1104 and that executes computer-executable program code and/or accesses information stored in the memory 1104 or storage 1106. The processor 1102 comprises a microprocessor, an application-specific integrated circuit ("ASIC"), a state machine, or other processing device. The processor 1102 includes one processing device or more than one processing device. Such a processor includes or is in communication with a computer-readable medium storing instructions that, when executed by the processor 1102, cause the processor to perform the operations described herein.

The memory 1104 and storage 1106 can include any suitable non-transitory computer-readable medium. The computer-readable medium includes any electronic, optical, magnetic, or other storage device capable of providing a processor with computer-readable instructions or other program code. Non-limiting examples of a computer-readable medium include a CD-ROM, a DVD, a magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler and/or an interpreter from code written in any suitable computer-programming language, including, for example, C, C++, C#, Visual Basic, Java, Python, Perl, JavaScript, and ActionScript.

The computing device 1100 also comprises a number of external or internal devices such as input or output devices. For example, the computing device 1100 is shown with an input/output ("I/O") interface 1108 that can receive input from input devices or provide output to output devices. A communication interface 1110 is also included in the computing device 1100 and can include any device or group of devices suitable for establishing a wired or wireless data connection to one or more data networks. Non-limiting examples of the communication interface 1110 include an Ethernet network adapter, a modem, and/or the like. The computing device 1100 transmits messages as electronic or optical signals via the communication interface 1110. A bus 1112 is also included to communicatively couple one or more components of the computing device 1100.

The computing device 1100 executes program code that configures the processor 1102 to perform one or more of the operations described above. The program code includes one or more modules. For example, the program includes the character profile engine 102 or other suitable engine, module, or application that can be used to generate a character profile of an individual. The program code is resident in the memory 1104, storage 1106, or any suitable computer-readable medium and executed by the processor 1102 or any other suitable processor. In some embodiments, modules are resident in the memory 1104. In additional or alternative embodiments, one or more modules are resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for training and applying a psychographic classification model usable for modifying online environments in accordance with psychographic profiles to prevent delivery of content to computing devices, the method including one or more processing devices performing operations comprising:
 obtaining training user-interaction data associated with historical electronic interactions of user devices;
 deriving psychographic dimensions from the training user-interaction data, wherein deriving the psychographic dimensions comprises identifying, with a linguistic-analysis algorithm, word patterns in a language usage from the training user-interaction data and mapping the word patterns to the psychographic dimensions, wherein the psychographic dimensions individually correspond to at least one of a personality trait, a compound trait, or a situational trait of individuals originating the historical electronic interactions;

training the psychographic classification model by adjusting weights applied to the psychographic dimensions, the training user-interaction data, and a responsive transaction resulting from the psychographic dimensions and the training user-interaction data; and prior to a transmission of one or more electronic content items to one or more target user devices via a data network:
providing a marketing device with access, via the data network, to the trained psychographic classification model;
obtaining, from the marketing device, input user-interaction data associated with one or more interactions with the one or more target user devices, wherein the input user-interaction data describes navigations within an online environment by the one or more target user devices;
generating user classification data including scores for the psychographic dimensions by applying the trained psychographic classification model to the input user-interaction data; and
causing the marketing device to personalize the online environment presented to the one or more target user devices by excluding, based on the user classification data, the one or more electronic content items from the transmission to the one or more target user devices.

2. The method of claim 1, wherein:
the training user-interaction data comprises at least one of textual-input data, survey-response data, or clickstream data generated by the historical electronic interactions of user devices; and
the operations further comprise:
identifying one or more words from the training user-interaction data;
deriving one or more character dimensions based on the one or more words and a psycholinguistic lexicon; and
generating an additional statistical model for determining a plurality of character dimensions based on the one or more words identified from the textual-input data.

3. The method of claim 2, wherein the psycholinguistic lexicon comprises a predetermined mapping of a type of word to a psycholinguistic category associated with a character dimension.

4. The method of claim 2, the operations further comprising:
deriving at least one of a particular compound trait or a particular situational trait from the one or more character dimensions;
validating the additional statistical model based at least in part on the particular compound trait or the particular situational trait derived from the training user-interaction data and the survey-response data.

5. The method of claim 1, wherein the personality trait describes a characteristic or quality that forms an individual's distinctive persona.

6. The method of claim 5, wherein the personality trait indicates at least one of agreeableness, openness, conscientiousness, extraversion, or neuroticism with respect to the individual.

7. The method of claim 1, wherein the compound trait describes a behavioral predisposition of an individual that indicates that the individual has sought, over a threshold number of times, information regarding a purchase item from a plurality of sources prior to making a purchase decision.

8. The method of claim 7, wherein the compound trait describes a behavioral predisposition of the individual that indicates that the individual has provided, over another threshold number of times, data input related to interacting with other individuals regarding a product.

9. The method of claim 8, wherein the data input includes at least one of contacting a seller of the product, inquiring about the product on a webpage, posting a review related to a previously-purchased product, and seeking a response from another reviewer regarding the product.

10. The method of claim 1, wherein a situational trait reflects a consideration of an individual with respect to purchasing a product in a particular situation, and wherein the consideration relates to one of a functional-consciousness consideration, a value-consciousness consideration, a social-consciousness consideration, or a shopping-enjoyment consideration.

11. The method of claim 10, wherein the functional-consciousness consideration relates to at least one of comfort, convenience, efficiency, or functionality that an individual associates with the product.

12. The method of claim 10, wherein the value-consciousness consideration relates to at least one of cost, usefulness, purchase risk, seller quality, comparative standing, perceived benefit, or review consensus that an individual associates with a product.

13. The method of claim 10, wherein the social-consciousness consideration relates to at least one of diversity, variety, recency, uniqueness, or social status that a individual associates with a product.

14. The method of claim 10, wherein the shopping-enjoyment consideration relates to at least one of safety, comfort, access, incentives, loyalty, choice enjoyment, or satisfaction that a individual associates with purchasing products.

15. The method of claim 2, wherein the plurality of character dimensions quantify a degree to which the personality trait, the compound trait, and situational trait influence a corresponding character profile of a person.

16. The method of claim 1, wherein the training user-interaction data comprises an electronic communication comprising at least one of a social media post, a product review, a blog, an article, a paper, an email, or a text message.

17. The method of claim 1, wherein the user classification data indicates a statistical probability value that quantifies a likelihood that a person will purchase a product as a result of being provided a particular marketing stimulus.

18. The method of claim 1, further comprising adjusting the trained psychographic classification model based on the input user-interaction data.

19. A system comprising:
a processor; and
a non-transitory computer-readable medium communicatively coupled to the processor, wherein the processor is configured for executing program code stored on the non-transitory computer-readable medium and thereby performing operations comprising:
- obtaining training user-interaction data associated with historical electronic interactions of user devices,
- deriving psychographic dimensions from the training user-interaction data, wherein deriving the psychographic dimensions comprises identifying, with a linguistic-analysis algorithm, word patterns in a language usage from the training user-interaction data and mapping the word patterns to the psychographic dimensions, wherein the psychographic dimensions individually correspond to at least one of a personality trait, a compound trait, or a situational trait of individuals originating the historical electronic interactions,
- training a psychographic classification model by adjusting weights applied to the psychographic dimensions, the training user-interaction data, and a responsive transaction resulting from the psychographic dimensions and the training user-interaction data, and
- prior to a transmission of one or more electronic content items to one or more target user devices via a data network:
  - providing a marketing device with access, via the data network, to the trained psychographic classification model,
  - obtaining, from the marketing device, input user-interaction data associated with one or more interactions with the one or more target user devices, wherein the input user-interaction data describes navigations within an online environment by the one or more target user devices;
  - generating user classification data including scores for the psychographic dimensions by applying the trained psychographic classification model to the input user-interaction data, and
  - causing the marketing device to personalize the online environment presented to the one or more target user devices by excluding, based on the user classification data, the one or more electronic content items from the transmission to the one or more target user devices.

20. A non-transitory computer-readable medium having program code stored thereon, the program code comprising:
- program code for obtaining training user-interaction data associated with historical electronic interactions of user devices;
- program code for deriving psychographic dimensions from the training user-interaction data, wherein deriving the psychographic dimensions comprises identifying, with a linguistic-analysis algorithm, word patterns in a language usage from the training user-interaction data and mapping the word patterns to the psychographic dimensions, wherein the psychographic dimensions individually correspond to at least one of a personality trait, a compound trait, or a situational trait of individuals originating the historical electronic interactions;
- program code for training a psychographic classification model by adjusting weights applied to the psychographic dimensions, the training user-interaction data, and a responsive transaction resulting from the psychographic dimensions and the training user-interaction data; and
- program code for performing, prior to a transmission of one or more electronic content items to one or more target user devices via a data network, operations comprising:
  - providing a marketing device with access, via the data network, to the trained psychographic classification model;
  - obtaining, from the marketing device, input user-interaction data associated with one or more interactions with the one or more target user devices, wherein the input user-interaction data describes navigations within an online environment by the one or more target user devices;
  - generating user classification data including scores for the psychographic dimensions by applying the trained psychographic classification model to the input user-interaction data; and
  - causing the marketing device to personalize the online environment presented to the one or more target user devices by excluding, based on the user classification data, the one or more electronic content items from the transmission to the one or more target user devices.

* * * * *